(12) United States Patent
Janakiraman et al.

(10) Patent No.: US 12,288,573 B2
(45) Date of Patent: Apr. 29, 2025

(54) HOUSINGS FOR ELECTRONIC DEVICES AND MEMORY DEVICES

(71) Applicant: Western Digital Technologies, Inc., San Jose, CA (US)

(72) Inventors: Vishnu Chandar Janakiraman, Penang (MY); Mutharasu Devarajan, Penang (MY); KL Bock, Penang (MY)

(73) Assignee: Sandisk Technologies, Inc., Milpitas, CA (US)

( * ) Notice: Subject to any disclaimer, the term of this patent is extended or adjusted under 35 U.S.C. 154(b) by 502 days.

(21) Appl. No.: 17/461,405

(22) Filed: Aug. 30, 2021

(65) Prior Publication Data

US 2023/0081057 A1 Mar. 16, 2023

(51) Int. Cl.
*C08J 7/04* (2020.01)
*B32B 15/085* (2006.01)
*C08J 7/046* (2020.01)
*G11B 33/14* (2006.01)

(52) U.S. Cl.
CPC ........ *G11B 33/1406* (2013.01); *B32B 15/085* (2013.01); *C08J 7/042* (2013.01); *C08J 7/046* (2020.01); *C08J 2300/16* (2013.01); *C08J 2323/12* (2013.01); *C08J 2401/02* (2013.01); *C08J 2455/02* (2013.01); *C08J 2459/00* (2013.01); *C08J 2469/00* (2013.01); *C08J 2477/00* (2013.01); *C08L 2201/06* (2013.01)

(58) Field of Classification Search
CPC ........ C08J 7/042; C08J 7/046; C08J 2323/12; C08J 2401/02; C08J 2300/16; G11B 33/022; C08L 2201/06

USPC ............................................. 428/1.1, 1.5, 1.6
See application file for complete search history.

(56) References Cited

U.S. PATENT DOCUMENTS

| | | | |
|---|---|---|---|
| 2020/0057178 A1* | 2/2020 | Thothadri | G02B 1/14 |
| 2022/0219358 A1* | 7/2022 | Suzuki | C08J 9/101 |

FOREIGN PATENT DOCUMENTS

| | | | |
|---|---|---|---|
| JP | H1192304 A | | 4/1999 |
| JP | H11309980 A | | 11/1999 |
| JP | 2002129042 A | | 5/2002 |
| JP | 2003284800 A | | 10/2003 |
| JP | 2007077273 A | | 3/2007 |
| JP | 2007106783 A | | 4/2007 |
| JP | 2007284587 A | * | 11/2007 |
| JP | 2008031358 A | | 2/2008 |
| JP | 2008239899 A | | 10/2008 |
| JP | 2008274222 A | | 11/2008 |
| JP | 2010167766 A | | 8/2010 |

(Continued)

*Primary Examiner* — Ruiyun Zhang
(74) *Attorney, Agent, or Firm* — PATTERSON + SHERIDAN, LLP

(57) ABSTRACT

Embodiments of the present disclosure generally relate to housings for, e.g., memory devices and electronic devices, and to processes for forming such housings. In an embodiment, an article for housing at least a portion of an electronic device is provided. The article includes a first component comprising a thermoplastic and a biodegradable filler or polymer, and a second component disposed on at least a portion of the first component, the second component comprising a plurality of layers. The article has a scratch visibility load of about 200 gms or more, an electrostatic discharge static voltage of about 100 V or less, a thermal conductivity of about 0.28 W/mK or more, or combinations thereof.

11 Claims, 4 Drawing Sheets

(56) References Cited

FOREIGN PATENT DOCUMENTS

| | | |
|---|---|---|
| JP | 2011068725 A | 4/2011 |
| JP | 2012205538 A | 10/2012 |
| JP | 2014122273 A | 7/2014 |
| JP | 2015501942 A | 1/2015 |
| JP | 2016183298 A | 10/2016 |
| WO | 2015111619 A1 | 7/2015 |

* cited by examiner

HOUSINGS FOR ELECTRONIC DEVICES AND MEMORY DEVICES

BACKGROUND OF THE DISCLOSURE

Field of the Disclosure

Embodiments of the present disclosure generally relate to housings for, e.g., memory devices and electronic devices, and to processes for forming such housings.

Description of the Related Art

Single-use plastic materials such as polycarbonate (PC), acrylonitrile-butadiene styrene (ABS), and PC/ABS are commonly utilized for solid state drive (SSD) enclosures, hard disk drive (HDD) products, and retail packaging (RPG) products such as USB flash drives, cables and connectors. However, such plastic materials are not highly recyclable, lack biodegradable material, and can be prone to scratching. The low sustainability and regulatory framework around these and other single-use plastics has shifted industrial efforts toward utilizing hybrid plastics with biodegradable content. In addition, and in the electronics industry, specifically, the rejection of PC, ABS, and PC/ABS packaging and enclosures of SSD, HDD, and RPG due to scratching can be very high in some instances.

Currently, there are very limited approaches to solving such issues for SSD, HPD, RPG, other memory devices, and electronic devices. In general, hybrid plastics are used in food packaging, cutlery, door trims, and similar products, but not utilized in the electronic packaging and semiconductor memory industry due to, e.g., undesirable thermal properties such as low heat deflection temperature and low thermal conductivity. To mitigate scratching and other defects, coatings have been utilized for cosmetic purposes in car interior panels, motion sensors, and camera covers but are not used as scratch-resistant coatings for enclosure and packaging applications where surface properties can be key in determining whether a product is rejected.

There is a need for new and improved packaging and enclosures, for e.g., memory devices and electronic devices that overcome one or more deficiencies in the art.

SUMMARY OF THE DISCLOSURE

Embodiments of the present disclosure generally relate to housings for, e.g., memory devices and electronic devices, and to processes for forming such housings.

In an embodiment, an article for housing at least a portion of an electronic device is provided. The article includes a first component comprising a thermoplastic and a biodegradable filler or polymer, and a second component disposed on at least a portion of the first component, the second component comprising a plurality of layers. The article has a scratch visibility load (ISO 4586-2) of about 200 gms or more, an electrostatic discharge (ESD) static voltage (ANSI/ESD S20.20) of about 100 V or less, a thermal conductivity (ISO 22007-2) of about 0.28 W/mK or more, or combinations thereof.

In another embodiment, an article is provided. The article includes an electronic device, and a coated substrate disposed on at least a portion of the electronic device. The coated substrate includes a polymer substrate comprising a polyolefin and a biodegradable filler or polymer, an amount of biodegradable filler or polymer in the polymer substrate is from about 30 wt % to about 50 wt %, based on a total weight of the polyolefin and the biodegradable filler or polymer, and a coating comprising a plurality of layers, the coating disposed on at least a portion of the polymer substrate. The article has a scratch visibility load (ISO 4586-2) of about 200 gms to about 400 gms, an electrostatic discharge (ESD) static voltage (ANSI/ESD S20.20) of about 50 V or less, a thermal conductivity (ISO 22007-2) of about 0.28 W/mK or more, or combinations thereof.

In another embodiment, a process for making a housing for an electronic device is provided. The process includes introducing a polymer substrate with a first mixture, the polymer substrate comprising a thermoplastic and a biodegradable filler or polymer, and drying or curing the first mixture to form a first layer on the polymer substrate. The process further includes introducing the polymer substrate with a second mixture, and drying or curing the second mixture to form a second layer on the first layer. The process further includes introducing the polymer substrate with a third mixture, and drying or curing the third mixture to form a third layer on the second layer, wherein at least a portion of the housing has a scratch visibility load (ISO 4586-2) of about 200 gms or more, an electrostatic discharge (ESD) static voltage (ANSI/ESD S20.20) of about 100 V or less, a thermal conductivity (ISO 22007-2) of about 0.28 W/mK or more, combinations thereof.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the present disclosure generally relate to housings for, e.g., memory devices and electronic devices, such as solid state drive (SSD), hard disk drive (HDD), and retail packaging (RPG) products, and to processes for forming such housings. The inventors have found new and improved articles for, e.g., housings, enclosures, and packaging of memory devices and electronic devices that are, e.g., made of sustainable materials, characterized by improved scratch resistance, mechanical and thermal properties as well as reduced electrostatic discharge (ESD) properties relative to conventional housings, packaging, and enclosures for memory devices and electronic devices. Briefly, and in some embodiments, the article includes a plastic material (or composite material) and a coating disposed on at least a portion of the plastic material that is, e.g., scratch resistant. The composite material can be a mixture of a thermoplastic and a biodegradable polymer such as long cellulose fiber (LCF). The mixture of thermoplastic and biodegradable polymer can be a blend and/or a natural-fiber reinforced composite. The coating, which is disposed on at least a portion of the composite material, can include a primer, a base coat, and a top coat. The plastic and degradable materials can serve to address the need of recyclability and biodegradability as it includes a recyclable polyolefin, e.g., PP, and a biodegradable polymer, e.g., long cellulose fiber. The coating serves to, e.g., improve the scratch resistance, hardness, and surface roughness of the enclosure or packaging over conventional enclosures and packaging of memory devices and electronic devices that utilize polycarbonate (PC), acrylonitrile-butadiene styrene (ABS), and/or PC/ABS.

Articles

Figure 1:
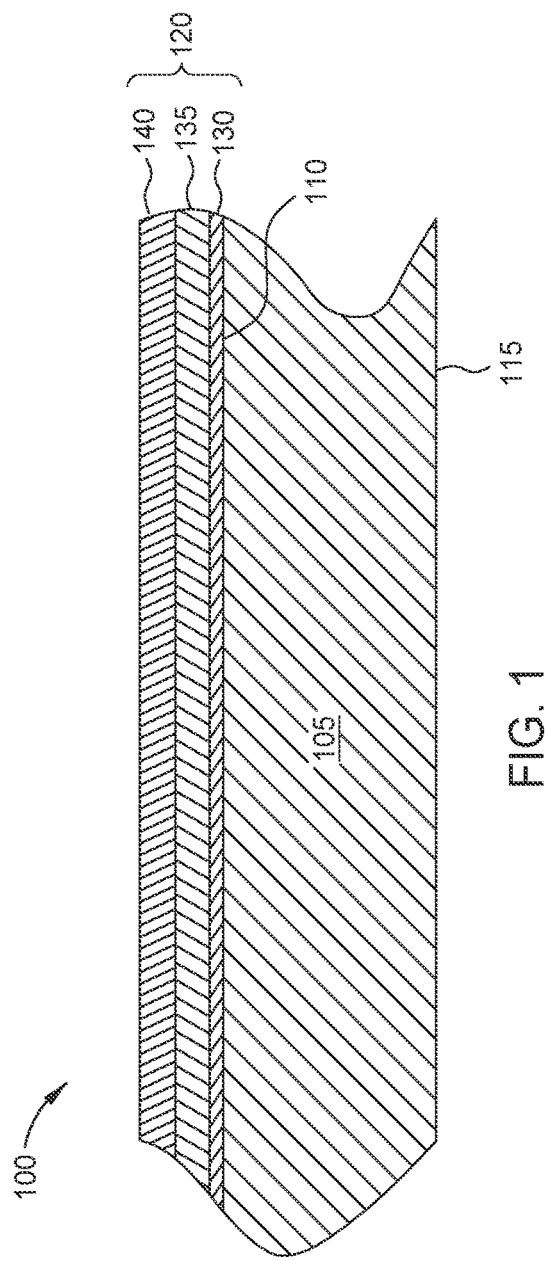
FIG. 1 is a cross-section of an example article according to at least one embodiment of the present disclosure.

FIG. 1 is a cross-section of an example article 100 according to at least one embodiment. The article 100 can be a structure utilized to, e.g., enclose, cover, surround, and/or house at least a portion of a memory device, electronic device, a component utilized with a memory device, a component utilized with an electronic device, and/or various other devices/products. That is, the article 100 can be an enclosure, a case, a housing, panel, a base, a cover, or any other suitable structure to enclose, cover, surround, and/or house at least a portion of a device or product. Generally, the article 100 includes at least two components.

With reference to FIG. 1, the first component 105 can be a polymer substrate and can include a thermoplastic polymer and a biodegradable polymer or filler, such as a hybrid plastic. The first component 105 has a first surface 110 and a second surface 115. The second surface 115 is the surface on a memory device, an electronic device, or a component utilized with a memory device or an electronic device, or other device/product. The first component 105 can be of any suitable shape or size in order to, e.g., enclose, cover, surround, and/or house at least a portion of a memory device, electronic device, a component utilized with a memory device, a component utilized with an electronic device, and/or various other devices/products. A thickness of the first component 105 can be from about 100 microns (μm) to about 10,000 μm, such as from about 250 μm to about 5000 μm, such as from about 1000 μm to about 2500 μm, such as from about 2500 μm to about 5000 μm. A larger or smaller thickness for the first component 105 is contemplated.

The thermoplastic of the first component 105 can be any suitable thermoplastic such as polymer compositions, e.g., polyolefin compositions (e.g., polypropylene, polyethylene, polyethylene terephthalate), polyamide compositions, polyvinylchloride compositions, polyvinyl fluoride, polyoxymethylene, poly(methyl methacrylate), polysulfone derivatives thereof, or combinations thereof. Thermoplastics obtained by polymerizing at least one monomer having about 2 to about 20 carbon atoms, such as about 2 to about 10 carbon atoms, such as ethylene, propylene, butylene, pentene, hexene, heptene, octene, nonene, decene, combinations thereof, isomers thereof, and the like, can be utilized. However, the polyolefin and/or thermoplastic are not limited to these.

A density of the thermoplastic(s) used in the first component 105 can be from about 0.88 g/cm$^3$ to about 0.95 g/cm$^3$, such as from about 0.89 g/cm$^3$ to about 0.94 g/cm$^3$, such as from about 0.90 g/cm$^3$ to about 0.93 g/cm$^3$. Density is determined by ISO 1183.

The biodegradable filler or polymer used in the first component 105 can be cellulose acetate, cellulose fiber (e.g., long cellulose fiber and/or short cellulose fiber), starch, or combinations thereof. Long cellulose fiber is characterized as having a fiber length of about 5 millimeters (mm) to about 9 mm, or more. Short cellulose fiber is characterized as having a fiber length of about 2 mm to about 3 mm.

A density of the biodegradable filler or polymer used in the first component 105 can be from about 1 g/cm$^3$ to about 2 g/cm$^3$, such as from about 1.1 g/cm$^3$ to about 1.75 g/cm$^3$, such as from about 1.2 g/cm$^3$ to about 1.5 g/cm$^3$. Density is determined by ISO 1183. In at least one embodiment, the density of the biodegradable filler or polymer used in the first component 105 is from about 1.3 g/cm$^3$ to about 1.6 g/cm$^3$, such as from about 1.45 g/cm$^3$ to about 1.5 g/cm$^3$.

The first component 105 can be a blend, a mixture, reinforcement, an extrusion product, and/or a reaction product of the thermoplastic(s) and the biodegradable polymer (s). The first component 105 of the article 100 can have one or more of the following characteristics:

A weight percent of the thermoplastic component in the first component 105 can be about 75 weight percent (wt %) or less, such as from about 45 wt % to about 75 wt %, such as from about 50 wt % to about 70 wt %, such as from about 55 wt % to about 65 wt %, such as from about 55 wt % to about 60 wt % or from about 60 wt % to about 65 wt %, based on a total weight of the first component 105 (i.e., the total weight of the thermoplastic(s) and the biodegradable polymer).

A weight percent of the biodegradable polymer in the first component 105 can be about 25 wt % or more, such as from about 25 wt % to about 55 wt %, such as from about 30 wt % to about 50 wt %, such as from about 35 wt % to about 45 wt %, such as from about 35 wt % to about 40 wt % or from about 40 wt % to about 45 wt %, based on the total weight of the first component 105 (i.e., the total weight of the thermoplastic(s) and the biodegradable polymer). The total weight percent of the first component 105 does not exceed 100 wt %. Increasing or decreasing the biodegradability content of the first component 105 is contemplated.

A density of the first component 105 can be about 1.5 g/cm$^3$ or less, such as from about 0.9 g/cm$^3$ to about 1.4 g/cm$^3$, such as from about 0.95 g/cm$^3$ to about 1.3 g/cm$^3$, such as from about 1 g/cm$^3$ to about 1.2 g/cm$^3$. A higher or lower density of the first component 105 is contemplated. The density is measured according to ISO 1183. In at least one embodiment, the density of the first component 105 is from about 1 g/cm$^3$ to about 1.15 g/cm$^3$, such as from about 1.05 g/cm$^3$ to about 1.1 g/cm$^3$.

A heat deflection temperature (HDT) of the first component 105, measured, can be about 89° C. or more, such as from about 100° C. to about 180° C., such as from about 120° C. to about 170° C., such as from about 130° C. to about 165° C. A higher or lower HDT of the first component 105 is contemplated. HDT is a measure of temperature resistance of the specified material. HDT is measured using a specimen with dimension (80 mm×10 m×4 mm) at 1.8 megapascals (MPa) according to ISO 75 standard using a HDT tester.

A tensile strength of the first component 105 can be about 50 MPa or more, such as from about 60 MPa to about 150 MPa, such as from about 80 MPa to about 140 MPa, such as from about 100 MPa to about 130 MPa. A higher or lower tensile strength of the first component 105 is contemplated. Tensile strength measures the stiffness and ability to withstand stress of the specified material. Tensile strength is measured using a specimen with a 75 mm gauge length according to ISO 527 standard by universal tensile machine (UTM).

A flexural strength of the first component 105 can be about 75 MPa or more, such as from about 90 MPa to about 190 MPa, such as from about 120 MPa to about 180 MPa, such as from about 140 MPa to about 175 MPa. Flexural strength measures the toughness and ability to withstand bend stress of the specified material. A higher or lower flexural strength of the first component 105 is contemplated. Flexural strength is measured using a specimen with dimension ((80 mm×10 mm×4 mm)±0.2 mm)) according to ISO 178 (International Organization for Standardization).

A notched impact strength of the first component 105 can be about 15 kilojoule per meter squared ($kJ/m^2$) or more, such as from about 20 $kJ/m^2$ to about 80 $kJ/m^2$, such as from about 30 $kJ/m^2$ to about 70 $kJ/m^2$, such as from about 40 $kJ/m^2$ to about 60 $kJ/m^2$. A higher or lower notched impact strength of the first component 105 is contemplated. Notched impact strength measures the amount of energy absorbed by the specified material being measured during fracture. Notched impact strength is measured using a sample with a dimension of about 80 mm×10 mm×4 mm with a notch depth of 0.25 mm radius according to ISO 179/1eA using a Charpy impact strength test machine.

In at least one embodiment, the first component 105 of the article 100 has: from about 35 wt % to about 45 wt % of biodegradable polymer, such as about 40 wt %, based on the total weight of the first component 105; about 55 wt % to about 65 wt % of the thermoplastic, such as about 60 wt %, based on the total weight of the first component 105; a density from about 1.05 $g/cm^3$ to about 1.25 $g/cm^3$, such as from about 1.05 $g/cm^3$ to about 1.10 $g/cm^3$; an HDT from about 140° C. to about 180° C., such as from about 155° C. to about 165° C., such as about 160° C.; a tensile strength of about 110 to about 200 MPa, such as from about 125 to about 140 MPa; a flexural strength of about 150 MPa to about 200 MPa, such as from about 165 MPa to about 175 MPa; and/or a notched impact strength of about 40 $kJ/m^2$ to about 70 $kJ/m^2$, such as from about 50 $kJ/m^2$ to about 60 $kJ/m^2$.

Referring again to FIG. 1, the second component 120 can be disposed on at least a portion of the first surface 110 of the first component 105. The second component 120 can be a coating that is, or includes, a multilayer structure. In some embodiments, the second component 120 includes a first layer 130 disposed on at least a portion of the first component 105, a second layer 135 disposed on at least a portion of the first layer 130, and a third layer 140 disposed on at least a portion of the second layer 135.

The first layer 130 can be a coating or a primer utilized for, e.g., enhancing adhesion between the first component 105 and the second layer 135. Illustrative, but non-limiting, examples of components included in the primer used to form the first layer 130 include synthetic resin, solvent, additives such as silica and/or $TiO_2$ particles, or combinations thereof. A thickness of the first layer 130 can be about 10 μm or less, such as about 5 μm or less, such as from about 1 μm to about 5 μm, such as from about 2 μm to about 4 μm, such as about 3 μm. A larger or smaller thickness for the first layer 130 is contemplated.

The second layer 135 can be a coating such as a base coating. The second layer 135 can be made from or include a paint, a thinner, and/or a hardener. A thickness of the second layer 135 can be from about 10 μm to about 30 μm, such as from about 15 μm to about 25 μm, such as about 18 μm to about 22 μm. A larger or smaller thickness for the second layer 135 is contemplated.

The third layer 140 can be a coating such as a top coating. The third layer 140 can be made from or include a paint, a thinner, and/or a hardener. A thickness of the third layer 140 can be from about 10 μm to about 30 μm, such as from about 15 μm to about 25 μm, such as about 18 μm to about 22 μm. A larger or smaller thickness for the third layer 140 is contemplated.

In some examples, and further described below, each of the first layer 130, the second layer 135, and the third layer 140, are independently formed on or deposited on the first component 105 by, e.g., spray coating and/or dip-coating the first component 105 with a first mixture, a second mixture, and a third mixture, respectively, and sequentially. Drying and/or curing operations can be performed prior to, during, and/or after forming each of the first layer 130, the second layer 135, and/or the third layer 140.

The materials used to form the first layer 130, the second layer 135, and/or the third layer 140 can be any suitable materials. Illustrative, but non-limiting, examples of components included in the paint include acrylic urethane based resin, $TiO_2$ particles, acetate, lactate, ketone based materials, or combinations thereof. Illustrative, but non-limiting, examples of components included in the thinner include acetate, lactate, xylene, methanol, ethanol, acetone, toluene, or combinations thereof. Illustrative, but non-limiting, examples of components included in the hardener include polyacrylate, isocyanate prepolymer, anhydride, phenols, amines, or combinations thereof.

The articles 100 described herein, which include a polymer substrate (e.g., a hybrid plastic material) and a coating disposed thereon have improved properties over conventional enclosures, cases, and covers as discussed below. The articles described herein (e.g., article 100) can have one or more of the following properties.

The article 100 can have an average surface roughness from about 0.1 μm to about 3 μm, such as from about 0.2 μm to about 2 μm, such as from about 0.5 μm to about 1 μm. In at least one embodiment, the average surface roughness of the article 100 can be about 0.4 μm or more, such as about 0.5 μm to about 2 μm. A higher or lower average surface roughness of the article 100 is contemplated. Average surface roughness is a measure of surface profile or finely spaced micro-irregularities on the surface of the specified material at different locations and is commonly used to indicate the level of roughness. Average surface roughness is measured according to ISO 4287:1997 standard using Mitutoyo surface profilometry. The article 100 can have a matt finish or a gloss finish.

The article 100 can have a scratch visibility load of about 100 gms or more, such as about 150 gms or more, such as about 200 gms or more, such as about 225 gms or more, such as about 250 gms or more, such as about 275 or more, such as about 300 gms or more, and/or about 500 gms or less, such as about 450 gms or less, such as about 400 gms or less, such as about 375 gms or less, such as about 350 gms or less, such as about 325 gms or less, such as about 300 gms or less. In at least one embodiment, the scratch visibility load of the article 100 is from about 200 to about 400 gms, such as from about 225 gms to about 375 gms, such as from about 250 gms to about 350 gms, such as from about 275 gms to about 325 gms. A higher or lower scratch visibility load of the article 100 is contemplated. Scratch visibility load is the load at which scratch marks are visible to naked eye and is an indirect measure of scratch resistance, with higher scratch visibility load values indicating higher scratch resistance of the specified material. Scratch visibility load is determined using a Taber Shear/Scratch tester according to ISO 4586-2 standard.

The article 100 can have a scratch hardness of about 1 gigapascals (GPa) or less, such as from about 0.2 GPa to about 0.9 GPa, such as from about 0.3 GPa to about 0.8 GPa, such as from about 0.4 GPa to about 0.75 GPa, such as from about 0.45 GPa to about 0.6 GPa. In at least one embodiment, the scratch hardness of the article 100 is from about 0.4 GPa to about 0.7 GPa. A higher or lower scratch hardness of the article 100 is contemplated. Scratch hardness is a measure of scratch resistance, with higher values indicating higher scratch resistance of the specified material. Scratch hardness is determined using a Taber Shear/Scratch tester according to ISO 4586-2 standard.

The article 100 can have a Shore D hardness of about 75 or more, such as from about 77 to about 100, such as from about 78 to about 95, such as from about 80 to about 90. A higher or lower Shore D hardness of the article 100 is contemplated. Shore D hardness is a measure of hardness, with higher values indicating higher strength, toughness, and or stiffness of the specified material. Shore D hardness is determined using a Checkline Shore D Durometer according to ISO 868 standard.

The article 100 can have a thermal conductivity of about 0.25 watts per meter-kelvin (W/(mK)) or more, such as about 0.28 W/mK or more and/or about 0.8 W/mK or less, such as from about 0.29 W/mK to about 0.60 W/mK, such as from about 0.30 W/mK to about 0.50 W/mK, such as from about 0.31 W/mK to about 0.40 W/mK. A higher or lower thermal conductivity of the article 100 is contemplated. Thermal conductivity measures the degree to which a specified material conducts heat. Thermal conductivity is measured using a Hot disk TPS 2500S thermal constant analyzer according to ISO 22007-2.

The article 100 can have an electrostatic discharge (ESD) static voltage that is less than about 500 volts (V), such as less than about 400 V, such as less than about 300 V, such as less than about 200 V, such as less than about 150 V, such as less than about 100 V, such as from about 1 V to about 100 V, such as from about 10 V to about 90 V, such as from about 20 V to about 80 V, such as from about 30 V to about 70 V, such as from about 40 V to about 60 V. In at least one embodiment, the ESD is less than about 50 V, such as less than about 10 V, such as from about 1 V to about 10 V, such as from about 2 V to about 9 V, such as about 3 V to about 8 V, such as from about 4 V to about 7 V, such as from about 5 V to about 6 V. An electrostatic Voltmeter is used to measure the actual potential (voltage) at the surface of the specified material under test. The ESD static voltage is a measure of the flow of electricity between the specified material and another object caused by contact. ESD static voltage is measured according to ANSI/ESD s20.20 standard using a static sensor.

In at least one embodiment, the article 100 has: an average surface roughness of about 0.5 µm or more, such as about 1 µm to about 2 µm; a scratch visibility load of about 200 gms to about 400 gms; a scratch hardness of about 0.4 GPa to about 0.7 GPa; a Shore D hardness of about 80 to about 90; an ESD of about 50 V or less, such as about 10 V or less; and/or a thermal conductivity of about 0.3 W/mK to about 0.4 W/mK.

As described above, the article 100 can be a structure utilized to, e.g., enclose, cover, surround, and/or house at least a portion of a memory device, electronic device, a component utilized with a memory device, a component utilized with an electronic device, and/or various other devices/products. Article 100 can be an enclosure, a case, a housing, panel, a base, a cover, or any other suitable structure to, e.g., enclose, cover, surround, and/or house at least a portion of a device or product.

Illustrative, but non-limiting, examples of electronic devices, memory devices, and other devices that can be utilized with article 100 include hard disk drive (HDD), solid state drive (SSD), universal serial bus (USB) flash drive, laptop housing, keyboard, mouse, SSD packaging, HDD packaging, sensor cover, camera cover, wi-fi router, automotive music system, plastic casing for electrical electronic goods, and components thereof. Also included are retail packaging (RPG) products such as USB cables and connectors, and components thereof.

Figure 2:
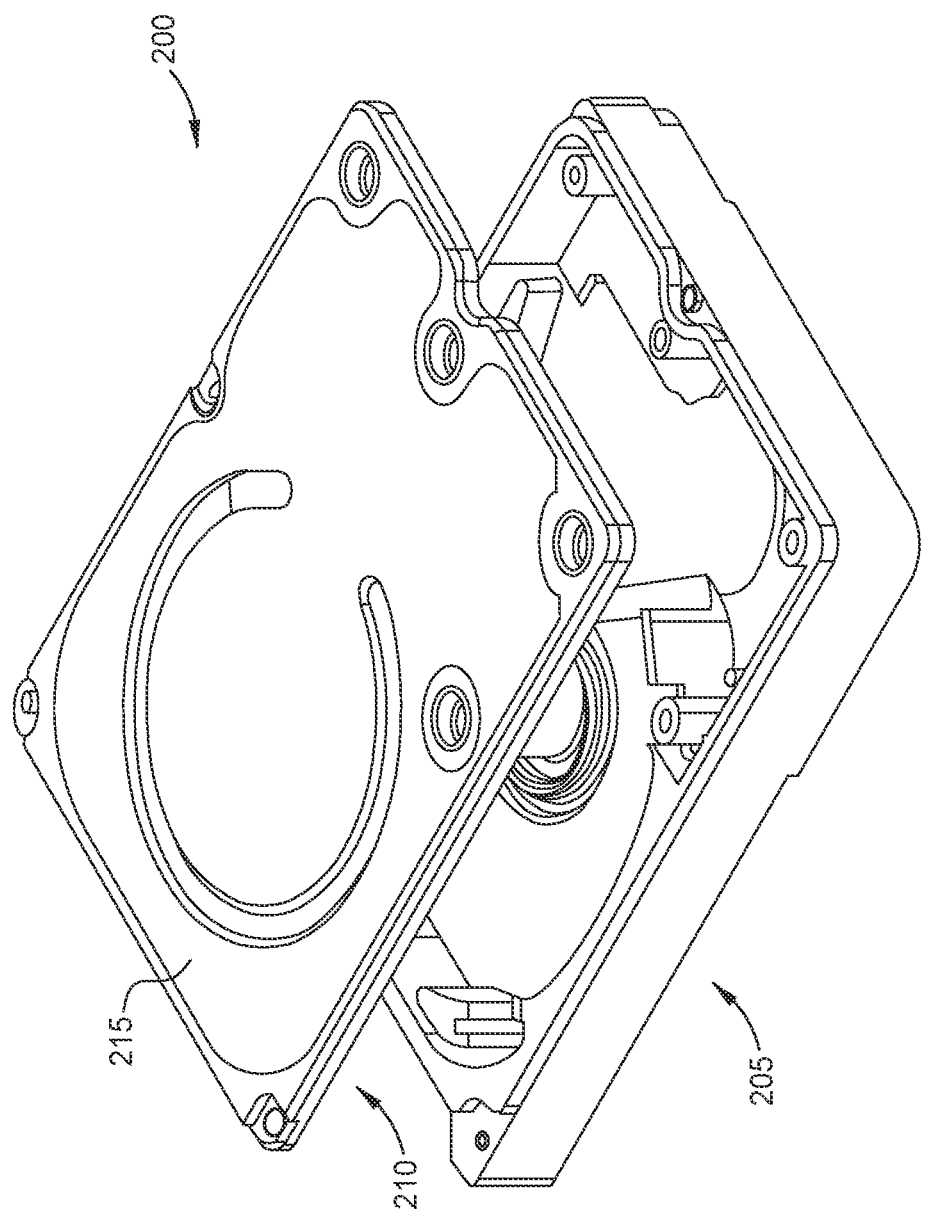
FIG. 2 is a top perspective exploded view of an example hard disk drive cover and a disk drive assembly incorporating an article described herein according to at least one embodiment of the present disclosure.

FIG. 2 is a top perspective exploded view of an example hard disk drive cover and a disk drive assembly 200 according to at least one embodiment. The hard disk drive cover and assembly includes a cover 210 having an outer surface 215 and a base assembly. At least a portion of the base assembly 205, cover 210, and/or outer surface 215 can include article 100 described above. Other portions such as the inner surface(s) of the hard disk drive cover and a disk drive assembly 200 can include article 100.

Figure 3:
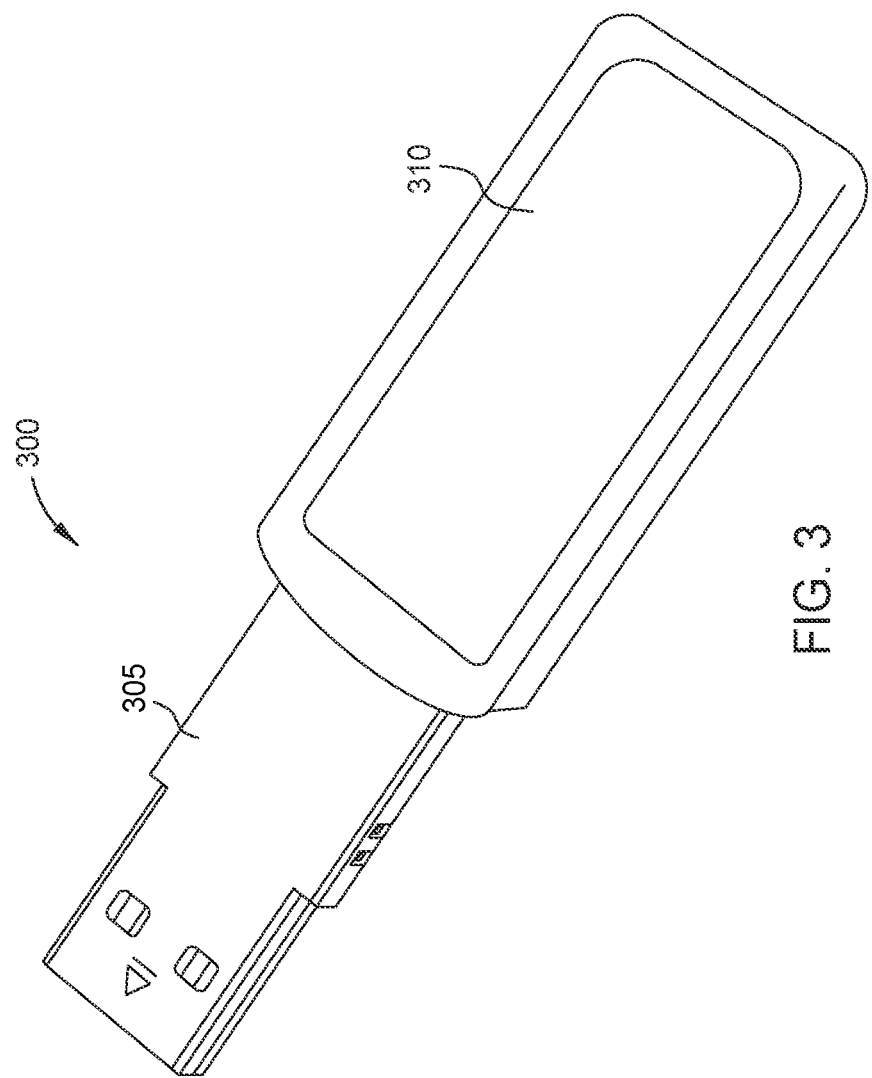
FIG. 3 is a perspective view of a top side of an example USB flash drive incorporating an article described herein according to at least one embodiment of the present disclosure.

FIG. 3 is a perspective of a top side of an example USB flash drive 300 incorporating an article described herein according to at least one embodiment. The USB flash drive 300 includes a cover 310 enclosing, covering, surrounding, and/or housing at least a portion of a USB device 305. At least a portion of cover 310 can include article 100 described above.

The memory devices shown in FIGS. 2 and 3 are non-limiting illustrations of uses for articles described herein and are not intended to limit the scope of embodiments of the present disclosure.

Processes to Form the Article

Embodiments of the present disclosure also relate to processes for making an article, e.g., article 100. Generally, and in some embodiments, at least a portion of the polymer substrate (or first component 105) can be contacted with various mixtures or compositions, sequentially. Before, during, and/or after contacting the polymer substrate with the mixtures or compositions, a drying and/or curing operation is performed to sequentially form the first layer 130, the second layer 135, and the third layer 140 of the article 100.

For the processes to form the articles as described herein, and in some embodiments, the materials utilized to form the first layer 130, second layer 135, and third layer 140 are introduced to the first component 105 in the form of a mixture, e.g., a solution or suspension. For example, a mixture which is utilized to form the first layer 130 can include synthetic resin, solvent, additives such as silica particles, TiO$_2$ particles, or combinations thereof.

The mixtures utilized to form each of the first layer 130, the second layer 135, and the third layer 140 are placed onto the substrate independently. These mixtures can be in the form of compositions. For example, when a first composition is utilized to form the first layer 130, the first layer 130 formed after drying/curing includes the first composition or reaction component(s) of the first composition; when a second composition is utilized to form the second layer 135, the second layer 135 formed after drying/curing includes the second composition or reaction component(s) of the second composition; and/or when a third composition is utilized to form the third layer 140, the third layer 140 formed after drying/curing includes the third composition or reaction component(s) of the third composition. Methods for introducing the mixtures with the first component 105 (or the polymer substrate) are described below.

Figure 4:
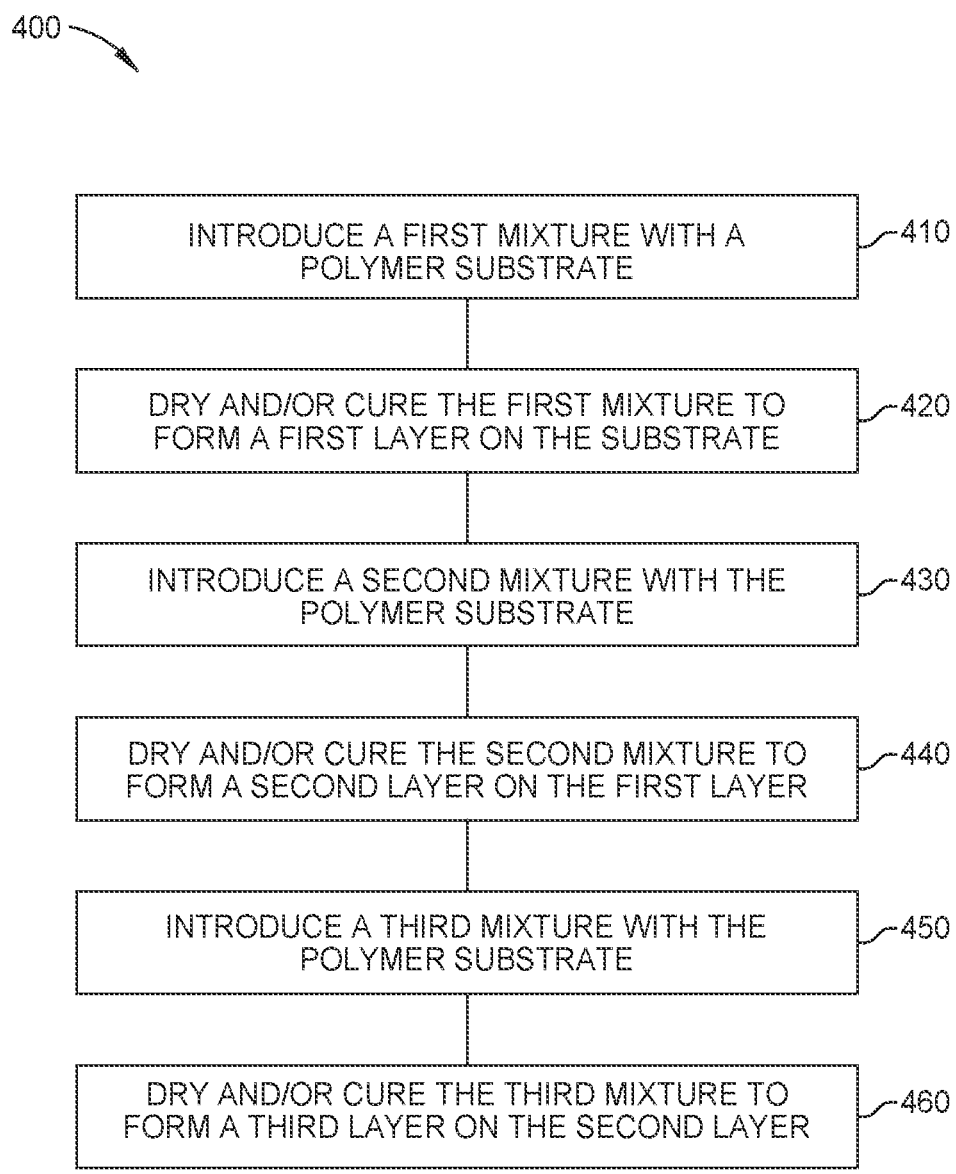
FIG. 4 illustrates selected operations of an example process for forming an article according to at least one embodiment of the present disclosure.

FIG. 4 illustrates selected operations of an example process 400 for forming an article, e.g., a coated or at least partially coated polymer substrate such as article 100, according to at least one embodiment. The process 400 begins by introducing the first mixture with at least a portion of the first component 105 (or polymer substrate) at operation 410. The first component 105 (or polymer substrate) can be in the form of, e.g., a plate, panel, base assembly, complete product, or combinations thereof utilized to, e.g., enclose, enclose, cover, surround, and/or house at least a portion of a memory device, electronic device, a component utilized with a memory device, a component utilized with an electronic device, or various other devices/products. The first mixture is then dried and/or cured to form the first layer 130 on at least a portion of the polymer substrate at operation 420. Conditions for drying and/or curing are described below.

At least a portion of the resultant substrate, having the first layer 130 formed thereon, is then introduced with the second mixture at operation 430. The second mixture is then dried and/or cured at operation 440 to form the second layer 135 on at least a portion of the first layer 130. At least a portion of the resultant substrate, having the first layer 130 and the second layer 135 formed thereon, is then introduced with the third mixture at operation 450. The third mixture is then dried and/or cured, at operation 460, to form the third layer 140 on at least a portion of the second layer 135. The resultant substrate, having the plurality of layers formed thereon, can be used as-is, shaped, molded, cut, etc. Although the process 400 describes depositing three layers on the polymer substrate, more or less layers are contemplated.

Paints, thinners, hardeners, and other materials used to form the mixtures or compositions are discussed above. The first layer 130, e.g., a primer, can be formed using a 1-part or 2-part primer that may include a paint, a solvent, or combination thereof.

In some examples, a weight ratio of primer in the first mixture/composition used to form the first layer 130 can be about 80 wt % to about 100 wt %. The remainder, or at least a portion of the remainder of the first mixture/composition, can include acetone, water, or combinations thereof. The weight ratio of primer in the first mixture used to form the first layer 130 is determined based on the starting material used for making the first mixture.

A weight ratio of paint to thinner, a weight ratio of paint to hardener, and a weight ratio of thinner to hardener in the second mixture used to form the second layer 135 (or base coat) can be varied.

For example, and in some embodiments, the weight ratio of paint to thinner in the second mixture used to form the second layer 135 can be from about 3.8:3.5 to about 3.8:4.5, such as from about 4.0:3.8 to about 4.0:4.2, such as from about 3.5:3.8 to about 4.5:3.8, such as from about 3.8:4.0 to about 4.2:4.0, such as about 4:4. Larger or smaller weight ratios of paint to thinner in the second mixture are contemplated.

A weight ratio of paint to hardener in the second mixture used to form the second layer 135 can be from about 2.5:0.5 to about 5.5:1.5, such as from about 3.0:0.6 to about 5.0:1.4, such as from about 3.5:0.8 to about 4.5:1.2. Larger or smaller weight ratios of paint to hardener in the second mixture are contemplated.

A weight ratio of thinner to hardener in the second mixture used to form the second layer 135 can be from about 2.5:0.5 to about 5.5:1.5, such as from about 3.0:0.6 to about 5.0:1.4, such as from about 3.5:0.8 to about 4.5:1.2. Larger or smaller weight ratios of thinner to hardener in the second mixture are contemplated.

A weight ratio of paint to thinner to hardener in the second mixture used to form the second layer 135 can be from about 3.8:3.5:0.5 to about 3.8:4.5:1.5, such as from about 4.0:3.8:0.8 to about 4.0:4.2:1.2, such as from about 3.5:3.8:0.5 to about 4.5:3.8:1.5, such as from about 3.8:4.0:0.8 to about 4.2:4.0:1.2, such as from about 3.8:3.8:0.9 to about 4.5:4.5:1.2 Larger or smaller weight ratios of paint to thinner to hardener in the second mixture are contemplated.

The weight ratio of paint to thinner, the weight ratio of paint to hardener, the weight ratio of thinner to hardener, and the weight ratio of paint to thinner to hardener in the second mixture used to form the second layer 135 is determined based on the starting material weight ratio used for making the second mixture.

Similarly, a weight ratio of paint to thinner, a weight ratio of paint to hardener, and a weight ratio of thinner to hardener in the third mixture used to form the third layer 140 (or top coat) can be varied.

For example, and in some embodiments, the weight ratio of paint to thinner in the third mixture used to form the third layer 140 can be from about 9.8:9.5 to about 9.8:10.5, such as from about 10.0:9.8 to about 10.0:10.2, such as from about 9.5:9.8 to about 10.5:9.8, such as from about 9.8:10.0 to about 10.2:10.0, such as about 10.0:10.0. Larger or smaller weight ratios of paint to thinner in the third mixture are contemplated.

A weight ratio of paint to hardener in the third mixture used to form the third layer 140 can be from about 8.5:0.5 to about 11.5:1.5, such as from about 9.0:0.6 to about 11.0:1.4, such as from about 9.5:0.8 to about 10.5:1.2. Larger or smaller weight ratios of paint to hardener in the third mixture are contemplated.

A weight ratio of thinner to hardener in the third mixture used to form the third layer 140 can be from about 8.5:0.5 to about 11.5:1.5, such as from about 9.0:0.6 to about 11.0:1.4, such as from about 9.5:0.8 to about 10.5:1.2. Larger or smaller weight ratios of thinner to hardener in the third mixture are contemplated.

A weight ratio of paint to thinner to hardener in the third mixture used to form the third layer 140 is from about 9.8:9.5:0.5 to about 9.8:10.5:1.5, such as from about 10.0:9.8:0.8 to about 10.0:10.2:1.2, such as from about 9.5:9.8:0.5 to about 10.5:9.8:1.5, such as from about 9.8:10.0:0.8 to about 10.2:10.0:1.2, such as about 10:10:1. Larger or smaller weight ratios of paint to thinner to hardener in the third mixture are contemplated.

The weight ratio of paint to thinner, the weight ratio of paint to hardener, and the weight ratio of thinner to hardener in the third mixture used to form the third layer 140 is determined based on the starting material weight ratio used for making the third mixture. Larger or smaller weight ratios of paint to thinner to hardener in the third mixture are contemplated.

Introduction of the first mixture at operation 410, introduction of the second mixture at operation 430, and introduction of the third mixture at operation 450 can be performed by any suitable method, including air spray coating, airless sprayer coating, dip-coating, slot-die coating, immersion, three-dimensional printing, roller coating, paint brush, electrostatic method, high volume low pressure (HVLP) spray or combinations thereof. Each of the introductions at operations 410, 430, and/or 450 can be, independently, in the form of a single introduction or multiple introductions. For example, each mixture can be introduced to the substrate one or more times, such as about two or more times, such as about 3, 4, or 5 times or more. Drying and/or curing can be performed at selected intervals, e.g., before, during, and/or after each introduction, or after two or more introductions. Each mixture can be introduced to one side, or more than one side, of the substrate.

Operations 420, 440, and 460 include drying and/or curing the substrate. The substrate can be dried or cured before, during, and/or after each introduction of mixture(s) to the substrate. Temperatures for drying/curing are selected to, e.g., provide sufficient removal of the solvent. Drying/curing temperatures can be less than about 150° C., such as from about 50° C. to about 150° C., such as from about 60° C. to about 100° C., such as from about 70° C. to about 90° C., such as from about 75° C. to about 85° C. In at least one embodiment, the drying/curing temperature is from about 70° C. to about 90° C. In some embodiments, the time duration for drying/curing of operations 420, 440, and 460 is at least about 30 seconds, such as at least about 2 minutes, such as from about 5 min to about 10 h, such as from about 30 min to about 5 h, such as from about 1 h to about 4 h, such as from about 2 h to about 3 h. In at least one embodiment, drying/curing can be performed for a time duration of about 1 min to about 1 h.

One or more methods for drying/curing can be employed, including oven drying, hot-air drying, hot air with directional assist drying, and/or short wave drying. Depending on the desired thickness of the individual layers—e.g., the first layer 130, the second layer 135, and the third layer 140—the dry/cure operations can be performed at those temperatures and time durations described above. Higher or lower temperatures, as well as longer or shorter time durations, for curing and/or drying are contemplated. Drying/curing operations can be performed in one or more oven/curing apparatus.

The following examples are put forth so as to provide those of ordinary skill in the art with a complete disclosure and description of how to make and use aspects of the present disclosure, and are not intended to limit the scope of embodiments of the present disclosure. Efforts have been made to ensure accuracy with respect to numbers used (e.g. amounts, dimensions, etc.) but some experimental errors and deviations should be accounted for.

EXAMPLES

HDT is measured at 1.8 MPa using a specimen with dimension of about 80 mm×10 mm×4 mm according to ISO 75 using a HDT tester. Tensile strength is measured using a specimen with 75 mm gauge length according to ISO 527 using a universal tensile machine. Flexural strength is measured using a specimen with dimension ((80 mm×10 mm×4 mm)±0.2 mm)) according to ISO 178 standard. Notched impact strength is measured using a sample with a dimension of about 80 mm×10 mm×4 mm with a notch depth of 0.25 mm radius according to ISO 179/1eA using a Charpy impact strength test machine.

Surface roughness is measured at five different location using a Mitutoyo Surface Profilometry (Model: Surftest SJ-410) according to ISO 4287:1997. Scratch visibility load and scratch width are obtained from a Taber Shear/Scratch tester (Model: 551) at room temperature according to ISO 4586-2 standard. Scratch hardness was calculated using the obtained scratch width. Shore D hardness is determined according to ISO 868 using a Checkline Shore D Durometer (Model: OS-1-E). Thermal conductivity is determined according to ISO 22007-2 using a Hot Disk® TPS 2500 S thermal constants analyzer. Electrostatic discharge (ESD) static voltage is determined using a static sensor (Model: SCS 718 static sensor) according to ANSI/ESD S20.20. The static sensor is placed at a distance of 1 inch or 2.5 cm from the material under test and the static voltage is measured. All the measurements are carried out at room temperature except HDT measurements.

A non-limiting example of a first component 105 (e.g., thermoplastic+biodegradable filler or polymer) and a comparative example (C.Ex.) of a conventional housing utilized for, e.g., enclosing at least a portion of a memory device or electronic product are shown in Table 1.

Example 1 (Ex. 1) is a long cellulose fiber reinforced polypropylene plastic (Plastron PPRF40-02-(L7)) obtained from Daicel Miraizu Ltd., Japan. C.Ex. 1 includes properties for various conventional PC resins, PC/ABS resins, and ABS resins. The PC resins include Panlite® L1225L commercially available from Teijin Ltd., Lupoy® PC 1301EP-30 commercially available from LG Chem., and Makrolon® 2407 commercially available from Covestro AG; the PC/ABS resin is Cycoloy® C9250 commercially available from Sabic Innovative Plastics; and the ABS polymer is ABS Toyolac® 700 UL 94-HB commercially available from Toray Plastics.

TABLE 1

| Characteristic | Ex. 1 | C. Ex. 1 |
|---|---|---|
| Amount of thermoplastic(s), wt % | 60 | 100 |
| Amount of biodegradable polymer(s), wt % | 40 | — |
| Density, g/cm$^3$ | 1.07 | 1.05-1.41 |
| HDT (0.45 MPa), ° C. | 160 | 89-139 |
| Tensile strength, MPa | 130 | 50-61 |
| Flexural strength, MPa | 170 | 76-85 |
| Notched impact strength, kJ/m$^2$ | 55 | 17-67 |

Table 1 indicates that the example hybrid plastic material (Ex. 1) utilized as the first component of an example article for, e.g., enclosing a portion of a memory device, possesses high biodegradable content, as well as improved thermal and mechanical properties over the conventional enclosure. The table also indicates that the example hybrid plastic material is suitable for SSD, HDD, RPG enclosure products, RPG, SSD, HDD packaging, laptop casing, keyboard casing or other electrical and electronics goods.

Table 2 shows various non-limiting example formulations utilized for example primers, example base coats, and example top coats. The example primer, example base coat, and example top coat can be a portion of the second component 120 of an article for, e.g., enclosing at least a portion of a memory device or electronic product, where the first layer 130 is an example primer, the second layer 135 is an example base coat, and the third layer 140 is an example top coat. The number of layers of primer for each example primer (Ex. 2-4), each example base coat (Ex. 5-8), and each example top coat (Ex. 9-12) was 1 layer, 1 layer, and 1 layer, respectively.

The mixture used for each primer, base coat, and top coat examples was made according to the Table and mixed using an industrial paint stirrer, then sprayed onto the first component for about 5-10 seconds using an auto/robotic spray gun and then dried at about 80° C. for about 30 minutes. The mixture used for each base coat example was made according to the Table and mixed, then sprayed onto the first component for about 5-10 seconds and the then dried at about 80° C. for about 30 minutes. The mixture for each top coat example was made according to the Table and mixed, then sprayed onto the first component for about 5-10 seconds and the then dried at about 80° C. for about 30 minutes. The example hybrid plastic is the example shown in Table 1.

and/or toluene with different weight percentages of components that are mixed with Paint C or D as provided in Table 2. Hardeners B and C contain polyacrylate, isocyanate prepolymer, anhydride, acetate, phenols, and/or amines with different weight percentages of components that are mixed with Paints C or D and Thinner B respectively as provided in Table 2. Paint A is commercially available as Multi primer EXC-3000 from Musashi Paint Corporation Sdn. Bhd.; Paints C and D are available under the commercial codes EC-P79-J-01437, EC-GPX79-J21-01737 from Musashi Paint Corporation Sdn. Bhd.; Thinner B is available under the commercial code EC-K775 from Musashi Paint Corporation Sdn. Bhd.; and Hardeners B, and C are available under the commercial code EC-H-330UN, & EC-H-250UN respectively from Musashi Paint Corporation Sdn. Bhd.

TABLE 2

Example Primers, Example Base Coats, and Example Top Coats

Example Primers

| | First component | Paint | Thinner | Hardener | Mixture ratio of paint:thinner:hardener | Layer thickness, μm |
|---|---|---|---|---|---|---|
| Ex. 2 | PC/ABS | — | — | — | 0:0:0 | — |
| Ex. 3 | Nylon | A | — | — | 1:0:0 | 3 ± 1 |
| Ex. 4 | PBT | A | — | — | 1:0:0 | 3 ± 1 |

Example Base Coats

| Base Coat Ex. | First component | Paint | Thinner | Hardener | Ratio of paint:thinner:hardener | Layer thickness, μm |
|---|---|---|---|---|---|---|
| Ex. 5 | PC/ABS | C | B | B | 4:4:1 | 20 ± 5 |
| Ex. 6 | POM | C | B | B | 4:4:1 | 20 ± 5 |
| Ex. 7 | Nylon | C | B | B | 4:4:1 | 20 ± 5 |
| Ex. 8 | PBT | C | B | B | 4:4:1 | 20 ± 5 |

Example Top Coats

| Top Coat Ex. | First component | Paint | Thinner | Hardener | Ratio of paint:thinner:hardener | Layer thickness, μm |
|---|---|---|---|---|---|---|
| Ex. 9 | PC/ABS | D | B | C | 10:10:1 | 10 ± 2 |
| Ex. 10 | POM | D | B | C | 10:10:1 | 10 ± 2 |
| Ex. 11 | Nylon | D | B | C | 10:10:1 | 10 ± 2 |
| Ex. 12 | PBT | D | B | C | 10:10:1 | 10 ± 2 |

In Table 2, PC/ABS refers to polycarbonate/acrylonitrile-butadiene styrene having a density of 1.14 g/cm$^3$, POM refers to polyoxymethylene based material having a density of 1.83 g/cm$^3$, PBT refers to a polybutylene terephthalate based material having a density of 1.61 g/cm$^3$, and Nylon refers to polyamide 66/6T based material having a density of 1.42 g/cm$^3$.

PC/ABS, POM, PBT, & Nylon based resins are commercially available under the tradename Bayblend T85 XF, Poticon AT68B, Poticon OB30, and Poticon NT863 respectively from Covestro, and Otsuka Chemical Co. Ltd. Paint A is a 1-part material which contains a synthetic resin, isobutyl alcohol, toluene or ketone, and additives such as silica or TiO$_2$ particles. Paints C, and D contain acrylic urethane based resin, cellosolve, isopropyl alcohol, isobutyl alcohol, TiO$_2$ particles, acetate, and/or ketone based materials with different weight percentages of components. Thinner B contains acetate, lactate, xylene, methanol, ethanol, acetone, Table 3 shows a non-limiting example coating (e.g., second component 120) that can be disposed on a surface of first component 105 of an example article that can be utilized for, e.g., enclosing at least a portion of a memory device or electronic product. For the example coating (Ex. 13) shown in Table 3, the primer was made according to the ratio shown in the Table and mixed, and sprayed for about 4-5 seconds onto an example hybrid plastic substrate (e.g., Ex. 1 shown in Table 1). The substrate was then dried at about 80° C. for about 30 minutes. The resultant substrate was then sprayed for about 7-8 seconds with the base coat made according to the Table and then dried at about 80° C. for about 30 minutes. The resultant substrate was then sprayed for about 7-8 seconds with the top coat made according to the Table and then dried at about 80° C. for about 30 minutes.

TABLE 3

Example Coating (Ex. 13)

| Ex. 13 | Paint | Thinner | Hardener | Ratio of paint:thinner:hardener | Layer thickness, μm | Spray time, sec |
|---|---|---|---|---|---|---|
| Primer | A | — | — | 1:0:0 | 3 ± 1 | 4-5 |
| Base Coat | C | B | B | 4:4:1 | 20 ± 5 | 7-8 |
| Top Coat | D | B | C | 10:10:1 | 10 ± 2 | 7-8 |

Table 4 shows various properties and characteristics of example articles (Ex. 14 and Ex. 15) that can be utilized for, e.g., enclosing a memory device. The example article (Ex. 14) includes the hybrid plastic material (shown in Table 1 as Ex. 1) with an example coating as shown in Table 3. Ex. 15 is the hybrid plastic material, shown in Table 1 as Ex. 1, without a coating. Properties of two conventional enclosures are also shown as Comparative Examples (C.Ex.) 2 and 3. The comparative examples are made of polycarbonate (PC) with different surface textures. C.Ex. 2 is Panlite® L1225L, and C.Ex. 3 is a polycarbonate resin commercially available from Songhan Plastic Technology Co. Ltd., under the tradename Kingfa® JH820 modified PC.

TABLE 4

| Sample | Ex. 14 | Ex. 15 | C. Ex. 2 | C. Ex. 3 |
|---|---|---|---|---|
| Material | Hybrid plastic material | Hybrid plastic material | PC | PC |
| Coating | see Table 3 | — | No coating, only Texture | No coating, only Texture |
| Average surface roughness, μm (matt/gloss) | 0.917 (matt) | 0.417 (gloss) | 2.92 (matt) | 4.21 (matt) |
| Scratch visibility load, gms | 300 | 200 | 100 | 200 |
| Scratch hardness, GPa | 0.59 | 0.45 | 0.13 | 0.39 |
| Electrostatic discharge (static voltage), V | <10 | <50 | 1970 | 1918 |
| Thermal conductivity, W/mK | 0.3236 | 0.3239 | 0.2825 | 0.2825 |
| Shore D hardness, D | 83.1 | 84.3 | 81.1 | 81.0 |

Table 4 indicates that Example 14 has improved scratch visibility load and scratch hardness over the comparative examples. Here, the higher scratch visibility load and scratch hardness of Example 14 indicates that it is more scratch resistant than the comparative examples. The Shore D hardness also improves, indicating that the example article has better strength, toughness and stiffness relative to the comparative examples.

Moreover, the electrostatic discharge (ESD) static voltage of Example 14 is significantly improved over the comparative polycarbonate examples—the ESD reduced from about 1900 V or more down to less than about 10 V. In addition, Example 14 shows improved thermal conductivity over the comparative examples indicating that the example article has better heat transfer capabilities.

Embodiments described herein generally relate to housings, enclosures, and packaging for, e.g., memory devices or electronic devices, and to processes for forming such housings, enclosures, and packaging. The housings, enclosures, and packaging can be made of a scratch-resistant hybrid plastic material that contains both recyclable & biodegradable content, and can be characterized as having improved scratch resistance, mechanical, thermal and reduced ESD properties relative to conventional housings.

As used herein, a "composition" can include component(s) of the composition and/or reaction product(s) of two or more components of the composition. Compositions of the present disclosure can be prepared by any suitable mixing process.

In the foregoing, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the aforementioned embodiments, aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise.

While the foregoing is directed to embodiments of the present disclosure, other and further embodiments of the disclosure may be devised without departing from the basic scope thereof, and the scope thereof is determined by the claims that follow.

What is claimed is:

1. An article for housing at least a portion of an electronic device, the article comprising:
  a first component comprising a thermoplastic and a biodegradable filler or polymer, wherein the thermoplastic is present in an amount of 55 wt % to about 65 wt %, wherein the biodegradable filler or polymer is present in an amount of 35 wt % to about 45 wt %, and wherein the first component has:
    a density from about 1.05 g/cm$^3$ to about 1.25 g/cm$^3$;
    a heat deflection temperature (HDT) from about 140° C. to about 180° C.;
    a tensile strength of about 110 MPa to about 200 MPa;
    a flexural strength of about 150 MPa to about 200 MPa; and
    a notched impact strength of about 40 kJ/m$^2$ to about 70 kJ/m$^2$; and
  a second component disposed on at least a portion of the first component, the second component comprising a plurality of layers, wherein the plurality of layers comprises at least three layers, wherein each layer of the plurality of layers has a different composition,
  the article having:
    a scratch visibility load (ISO 4586-2) of about 200 gms or more;
    an electrostatic discharge (ESD) static voltage (ANSI/ESD S20.20) of about 100 V or less;
    a thermal conductivity (ISO 22007-2) of about 0.28 W/mK or more; or
  combinations thereof.

2. The article of claim 1, wherein an amount of biodegradable polymer in the first component is about 30 wt % or more based on a total weight of the first component.

3. The article of claim 1, wherein:
  the thermoplastic comprises polypropylene, polyethylene, polyethylene terephthalate, polyamide, polyvinylchloride, polyvinyl fluoride, polyoxymethylene, poly(methyl methacrylate), polysulfone derivatives, or combinations thereof;
  the biodegradable filler or polymer comprises long cellulose fiber, short fiber, starch, cellulose acetate, or combinations thereof.

4. The article of claim 1, wherein:
  the thermoplastic comprises polypropylene; and
  the biodegradable filler or polymer comprises long cellulose fiber.

5. The article of claim 1, wherein the electronic device comprises a hard disk drive, a solid state drive, a universal serial bus (USB) flash drive, a laptop housing, a keyboard, a mouse, USB packaging, SSD packaging, HDD packaging, a sensor cover, a camera cover, a wi-fi router, or an automotive music system.

6. The article of claim 1, wherein the plurality of layers comprises:
  a first layer disposed on at least a portion of the first component;
  a second layer disposed on at least a portion of the first layer; and
  a third layer disposed on at least a portion of the second layer, the first layer comprising a primer for enhancing adhesion between the first component and the second layer.

7. The article of claim 6, wherein the second layer comprises reaction product of paint, thinner, and hardener.

8. The article of claim 7, wherein a ratio of the paint, the thinner, and the hardener used to form the reaction product is from about 3.5:3.8:0.5 to about 4.5:3.8:1.5.

9. The article of claim 6, wherein the third layer comprises a reaction product of paint, thinner, and hardener.

10. The article of claim 9, wherein a ratio of the paint, the thinner, and the hardener used to form the reaction product is from about 9.5:9.8:0.5 to about 10.5:9.8:1.5.

11. The article of claim 1, wherein the article has:
  an average surface roughness (ISO 4287:1997) of about 0.5 μm to about 2 μm;
  a scratch hardness (ISO 4586-2) of about 0.4 GPa to about 0.8 GPa;
  a thermal conductivity (ISO 22007-2) of about 0.28 W/mK to about 0.5 W/mK;
  a Shore D hardness (ISO 868) of about 78 to about 88; or combinations thereof.

* * * * *